United States Patent
Stocco et al.

(10) Patent No.: US 7,819,971 B2
(45) Date of Patent: Oct. 26, 2010

(54) METHOD OF USING LANDPLASTER AS A WALLBOARD FILLER

(75) Inventors: Louis P. Stocco, Valparaiso, IN (US); Jacob A. Zdrojewski, Hobart, IN (US)

(73) Assignee: United States Gypsum Company, Chicago, IL (US)

(*) Notice: Subject to any disclaimer, the term of this patent is extended or adjusted under 35 U.S.C. 154(b) by 739 days.

(21) Appl. No.: 11/647,748

(22) Filed: Dec. 29, 2006

(65) Prior Publication Data
US 2008/0160340 A1 Jul. 3, 2008

(51) Int. Cl.
*C04B 11/00* (2006.01)
(52) U.S. Cl. .................. 106/772; 106/778; 156/39
(58) Field of Classification Search .......... 106/772, 106/778; 156/39
See application file for complete search history.

(56) References Cited

U.S. PATENT DOCUMENTS

| | | |
|---|---|---|
| 5,320,677 A | 6/1994 | Baig |
| 5,643,510 A | 7/1997 | Sucech |
| 5,798,425 A | 8/1998 | Albrecht et al. |
| 6,342,284 B1 | 1/2002 | Yu et al. |
| 6,409,823 B1 * | 6/2002 | Shake et al. ............... 106/772 |
| 6,409,825 B1 * | 6/2002 | Yu et al. ..................... 106/776 |
| 6,527,850 B2 | 3/2003 | Schwartz et al. |
| 6,632,550 B1 | 10/2003 | Yu et al. |
| 6,777,517 B1 | 8/2004 | Albrecht |
| 6,869,988 B2 | 3/2005 | Schwartz et al. |
| 7,070,648 B1 | 7/2006 | Schwartz et al. |
| 7,261,772 B1 | 8/2007 | Schwartz et al. |
| 7,393,424 B2 | 7/2008 | Schwartz et al. |
| 2006/0042519 A1 | 3/2006 | Bowe et al. |
| 2006/0278130 A1 | 12/2006 | Liu et al. |
| 2006/0281886 A1 | 12/2006 | Bichler et al. |
| 2007/0044687 A1 | 3/2007 | Blackburn et al. |
| 2007/0044688 A1 * | 3/2007 | Blackburn et al. .......... 106/772 |

* cited by examiner

*Primary Examiner*—Paul Marcantoni
(74) *Attorney, Agent, or Firm*—Greer, Burns & Crain, Ltd.; Philip T. Petti, Esq.; David F. Janci, Esq.

(57) ABSTRACT

A gypsum slurry includes calcium sulfate hemihydrate, water and calcium sulfate dihydrate, where the calcium sulfate dihydrate is added downstream of the mixer.

In an optional embodiment, the a gypsum slurry includes calcium sulfate hemihydrate, a polycarboxylate dispersant, water and coated calcium sulfate dihydrate. In this case, the hydrophilic, dispersible coating is selected to serve as a modifier to enhance the ability of the dispersant to fluidize the gypsum slurry.

8 Claims, No Drawings

METHOD OF USING LANDPLASTER AS A WALLBOARD FILLER

FIELD OF THE INVENTION

The present invention is directed to a method of utilizing landplaster as a filler in gypsum slurries. More specifically, landplaster is added to the gypsum slurry outside of the stucco mixer to reduce or delay its ability to seed crystallization reactions.

BACKGROUND OF THE INVENTION

Gypsum-based building products are commonly used in construction. Wallboard made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, for example, that which is a byproduct of flue gas desulfurization processes from power plants, may also be used. When it is mined, raw gypsum is generally found in the dihydrate form. In this form, there are two water molecules associated with each molecule of calcium sulfate. To produce the hemihydrate form, the gypsum is calcined to drive off some of the water of hydration by the following equation:

$$CaSO_4 \cdot 2H_2O \rightarrow CaSO_4 \cdot 1/2H_2O + 3/2H_2O$$

A number of useful gypsum products can be made by mixing the stucco with water and permitting it to set by allowing the calcium sulfate hemihydrate to react with water to convert the hemihydrate into a matrix of interlocking calcium sulfate dihydrate crystals. As the matrix forms, the product slurry becomes firm and holds a desired shape. Excess water must then be removed from the product by drying.

Significant amounts of energy are expended in the process of making gypsum articles. Landplaster is calcined to make stucco by heating it to drive off water of hydration. Later the water is replaced as the gypsum sets by hydration of the hemihydrate to the dihydrate form. Excess water used to fluidize the slurry is then driven from the set article by drying it in an oven or a kiln. Thus, reducing the amount of water needed to fluidize the slurry turns into a monetary savings when fuel requirements are decreased. Additional fuel savings would result if the amount of material that required calcining were reduced.

Attempts have been made to reduce the amount of water used to make a fluid slurry using dispersants. Polycarboxylate superplasticizers are very effective in allowing water reduction and where water reduction results in increased density, a strength increase is achieved. These materials are relatively expensive. When used in large doses, polycarboxylate dispersants can be one of the single, most expensive additives in making gypsum products. The high price of this component can overcome the narrow margins afforded these products in a highly competitive marketplace.

Another disadvantage associated with polycarboxylate dispersants is the retardation of the setting reaction. Gypsum board is made on high-speed production lines where the slurry is mixed, poured, shaped and dried in a matter of minutes. The board must be able to hold its shape to be moved from one conveyor line to another to put the board into the kiln. Damage can occur if the boards have not attained a minimum green strength by the time they are cut to length and handled during the manufacturing process. If the board line has to be slowed down because the board is not sufficiently set to move on to the next step in the process, production costs are driven up, resulting in an economically uncompetitive product.

Modifiers have been found that increase the efficacy of the dispersant in fluidizing the slurry, allowing the modifier to replace a portion of the expensive dispersant while still reducing water demand. However, it has been found that the modifier does not work consistently, depending on how and when it is added to the slurry. Thus, there is a need for a delivery vehicle to carry the modifier to the slurry in a manner that allows it to perform consistently so that the amount of dispersant can be reduced.

The use of fillers that are easily fluidizable in water have been considered as another method of reducing fuel demand. However, one of the important properties of gypsum products, and especially gypsum panels or wallboard, is its fire resistance. Calcium sulfate dihydrate is approximately 20% water by weight. Replacing a portion of the calcined gypsum with fillers that are less fire retardant diminishes this property in the finished product. Many fillers also reduce the compressive strength and the nail pull strength of wallboard.

Landplaster has been used as a filler in gypsum products. It is also fire retardant, inexpensive, readily available and reduces the amount of calcined gypsum that is needed, but it also has disadvantages. Calcium sulfate dihydrate used in sufficient quantities to act as a filler also acts as a set accelerator for the hemihydrate by providing seed crystals that start the crystallization process more quickly. This leads to premature stiffening of the slurry.

Thus there is a need in the art for a filler for use in gypsum articles, particularly wallboard, that reduces fuel consumption by replacing calcined gypsum, by reducing the amount of water driven from the set product or both. The filler should have fire retardancy approximately equal to set gypsum and it should be inexpensive, readily available and should not decrease the strength of the finished product.

Thus, there is a need in the art to reduce the dosage of dispersants used in a gypsum slurry while maintaining flowability of the slurry. Reduction in dispersant use would result in saving of costs spent on the dispersant and would reduce adverse side effects, such as set retardation.

SUMMARY OF THE INVENTION

These and other needs are met or exceeded by the use of the present invention which utilizes an improved method of utilizing landplaster as a filler in gypsum products.

One embodiment of this invention is drawn to a method of making a gypsum slurry that includes combining calcium sulfate hemihydrate, water and a set retarder in a mixer. Calcium sulfate dihydrate is added to the gypsum slurry downstream of the mixer. Optionally, the landplaster is combined with water prior to addition to the gypsum slurry.

Another embodiment of this invention is a gypsum slurry that includes calcium sulfate hemihydrate, a polycarboxylate dispersant, water and coated calcium sulfate dihydrate. In this case, a modifier is optionally added to enhance the ability of the dispersant to fluidize the gypsum slurry.

A method of making a gypsum panel includes mixing calcium sulfate hemihydrate and water in a mixer, then combining it with calcium sulfate dihydrate after the slurry exits the mixer. The slurry is deposited on a facing material and allowed to set.

Replacement of a portion of the calcined gypsum with landplaster results in lower requirements for calcined gypsum, resulting in savings realized from a reduction in fuel and power consumed by the calcining process. Plants that are limited by stucco production may also achieve an increase in capacity since more wallboard can be made with the same amount of stucco.

Adding the landplaster after mixing reduces its ability to act as a set accelerator. By adding the calcium sulfate dihydrate late in the process, the hemihydrate molecules have limited access to the seed crystals prior to forming it into an appropriate article. The ability to control when the landplaster is available to initiate setting reactions allows reduction the usage of set accelerator, resulting in a cost savings. Down time of equipment is reduced compared to adding calcium sulfate dihydrate crystals to the mixer where there is a risk of premature stiffening.

Where there is a capacity increase, it is obtained without a significant increase in capital spending. This capital becomes available for other projects or interest that may have been paid could be saved. Since a large number of plants are limited by either stucco production or by kiln drying, use of this coating could have wide application.

In some embodiments, the loss in strength is avoided entirely. Landplaster results in higher strengths than many other fillers. At least one of the preferred coatings results in a product where there is no loss in strength at all. This produces a particularly good product, having many of the properties of gypsum set from 100% calcined gypsum.

DETAILED DESCRIPTION OF THE INVENTION

The gypsum slurry of this invention is made using water, calcined gypsum and a landplaster, where the landplaster is added downstream of the mixer. Although the benefits of this invention are most clear when used in a slurry that includes a polycarboxylate, it is useful in any embodiment where it is desirable to utilize landplaster as a filler but premature thickening is to be avoided.

Any calcined gypsum or stucco, including a mixture of various stuccos, is useful in this slurry. Either alpha or beta calcined stucco is useful. Stuccos from any source can be used, including synthetic gypsum. As discussed below, average or low salt stuccos are preferred in embodiments where polycarboxylate dispersants are used due to possible interaction.

The calcium sulfate hemihydrate is combined with water to make a slurry in a mixer. Any commercial mixer is useful, but preferably, the mixer is a commercial scale, short residence time mixer. Water is charged to the mixer. Optional dry ingredients are metered into the calcium sulfate hemihydrate, then all dry ingredients are added to the mixer. The slurry exits the mixer, preferably in a continuous fashion.

Upon exiting the mixer, foam is added to the slurry to reduce the weight of the set product. Some embodiments of the invention employ a foaming agent to yield voids in the set gypsum-containing product to provide lighter weight. In these embodiments, any of the conventional foaming agents known to be useful in preparing foamed set gypsum products can be employed. Many such foaming agents are well known and readily available commercially, e.g. the HYONIC line of soaps from GEO Specialty Chemicals, Ambler, Pa. Foams and a preferred method for preparing foamed gypsum products are disclosed in U.S. Pat. No. 5,683,635, herein incorporated by reference. The foam is preferably added to the slurry stream by means of a boot.

Landplaster is used as a filler to replace a portion of the stucco. Since landplaster is calcium sulfate in the dihydrate form, it requires no water of hydration and thus has less of a water demand than stucco. The landplaster does not participate in the crystal formation reactions, and therefore does not become bound into the crystal matrix to the same degree as the hemihydrate. Some loss in strength occurs, particularly if the amount of landplaster exceeds 10% of the total amount of gypsum materials. Any amount of landplaster may be used, but preferably, the measured amount of landplaster is about 3-10% of the total calcium sulfate materials on a dry basis. As used in this application, the term "calcium sulfate materials" includes calcium sulfate in all of its forms, including the anhydrite, hemihydrate and the dihydrate forms.

The landplaster is added to the slurry downstream of the mixer. The energy of mixing is believed to expose the stucco more quickly to the calcium sulfate dihydrate crystals, enhancing the "seeding" effect. Once exposed to the dihydrate seed crystals, stiffening of the slurry is accelerated. While stiffening is desirable after a product article is formed, it is not desired while the slurry is in the mixer or transfer lines. Exposing the stucco to the landplaster after mixing also provides less time between contact of the stucco with the dihydrate particles and formation of the gypsum article when stiffening of the stucco is desirable.

Preferably, the landplaster is added to the gypsum slurry after foam addition. Combination of the landplaster and gypsum slurry is also contemplated prior to foam addition, or at other steps of the manufacturing process, particularly if foam is not added at all.

In some preferred embodiments, the landplaster is added to water to make a landplaster slurry prior to its addition to the gypsum slurry. Optionally, the water is warm when the landplaster is added to it. Water temperatures up to 120° F. (49° C.) are especially useful, and the use of higher temperatures is contemplated.

No special mixing is needed when the landplaster or landplaster slurry is added to the gypsum slurry. After combination, the product slurry flows through one or more hoses or tubes to reach a forming table. Flow of the slurry along this path is generally sufficient to mix the landplaster and the hemihydrate to a suitable extent. Where there is a short flow path, use of a mixing aid, such as a static mixer, is optionally used.

The landplaster is optionally coated with any applicable coating that prevents early onset of thickening of the gypsum slurry. Preferably, the coating is less soluble than the stucco, providing time for mixing and incorporation of other additives before the landplaster is exposed. The coating is applicable to the landplaster in any suitable coating method. Preferably the landplaster is added to a coating solution. Once coated, the landplaster is optionally dried for later use. However, in a preferred coating method, the coating is precipitated onto the landplaster while the landplaster remains slurried with the coating solution. Energy required to dry the landplaster is saved. The coating slurry with the coated landplaster is then incorporated with the stucco slurry before the product is formed.

Many coatings are useful in the present invention. Preferred coatings include DEQUEST particularly DEQUEST 2006, phosphonate dispersants (Solutia, St. Louis, Mo.) or calcium carbonate. Other coatings made of trisodium phosphate or tetrasodium pyrophosphate are also useful. Any material is usable that is capable of being coated onto the landplaster particles, that is less soluble than the landplaster and reduces the active sites of nucleation.

The coating that is particularly useful is calcium carbonate. The coating is preferably formed by precipitation of the calcium carbonate onto the calcium sulfate dihydrate, or landplaster, from solution. One embodiment of the coating is obtained by combining hydrated lime, such as calcium magnesium hydroxide, and soda ash or sodium carbonate. Next the calcium sulfate dihydrate is added. A replacement reaction occurs, bringing calcium carbonate together to form a solid. The addition of lime also causes the calcium carbonate to precipitate onto the landplaster specifically, rather than on the interior of the mixer or other equipment. After the coated landplaster has been prepared, the stucco and any other additives are added to the slurry. When 10% by weight of the total calcium sulfate material is in the form of landplaster coated with calcium carbonate and 90% by weight of the calcium sulfate material is in the form of hemihydrate, almost 10% water reduction is achieved compared to 100% hemihydrate.

In some embodiments, reduction in the amount of water used to make the slurry is achieved by the addition of a dispersant, such as a polycarboxylate or naphthalene sulfonate. The dispersant attaches itself to the calcium sulfate, then charged groups on the backbone and the side chains on the branches of the polymer repel each other, causing the gypsum particles to spread out and flow easily. When the slurry flows more easily, the amount of water can be reduced and still obtain a flowable fluid. In general, reduction in water results in lower drying costs.

Any polycarboxylate dispersant that is useful for improving fluidity in gypsum is optionally used in the slurry of this invention. Use of dispersants reduces the amount of water needed to fluidize the slurry, and can result in additional energy savings if the gypsum product is kiln dried. A number of polycarboxlate dispersants, particularly polycarboxylic ethers, are preferred types of dispersants. One of the preferred class of dispersants used in the slurry includes two repeating units. It is described further in co-pending U.S. Ser. No. 11/152,418, entitled "Gypsum Products Utilizing a Two-Repeating Unit System and Process for Making Them", hereby incorporated by reference. These dispersants are products of Degussa Construction Polymers, GmbH (Trostberg Germany) and are supplied by Degussa Corp. (Kennesaw, Ga.) (hereafter "Degussa") and are hereafter referenced as the "PCE211-Type Dispersants".

The first repeating unit is an olefinic unsaturated monocarboxylic acid repeating unit, an ester or salt thereof, or an olefinic unsaturated sulphuric acid repeating unit or a salt thereof. Preferred first repeating units include acrylic acid or methacrylic acid. Mono- or divalent salts are suitable in place of the hydrogen of the acid group. The hydrogen can also be replaced by hydrocarbon group to form the ester.

The second repeating unit satisfies Formula I,

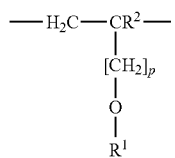

and $R_1$ is derived from an unsaturated (poly)alkylene glycol ether group according to Formula II.

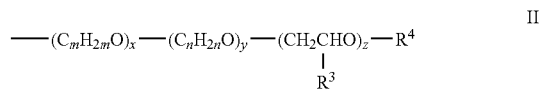

Referring to Formula I, the alkenyl repeating unit optionally includes a $C_1$ to $C_3$ alkyl group between the polymer backbone and the ether linkage. The value of p is an integer from 0-3, inclusive. Preferably, p is either 0 or 1. $R^2$ is either a hydrogen atom or an aliphatic $C_1$ to $C_5$ hydrocarbon group, which may be linear, branched, saturated or unsaturated. Examples of preferred repeating units include acrylic acid and methacrylic acid.

The polyether group of Formula II contains multiple $C_2$-$C_4$ alkyl groups, including at least two different alkyl groups, connected by oxygen atoms. M and n are, independently, integers from 2 to 4, inclusive. Preferably, at least one of m and n is 2. X and y are, independently, integers from 55 to 350, inclusive. The value of z is from 0 to 200, inclusive. $R^3$ is a non-substituted or substituted aryl group and preferably phenyl. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c).

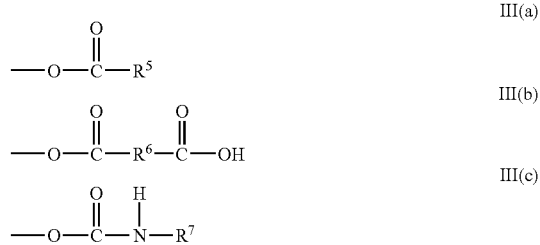

In the above formulas, $R^5$ and $R^7$, independently of each other, represent an alkyl, aryl, aralkyl or alkylaryl group. $R^6$ is a bivalent alkyl, aryl, aralkyl or alkylaryl group. A particularly useful dispersant of the PCE211-Type Dispersants is designated PCE211 (hereafter "211"). Other polymers in this series known to be useful in wallboard include PCE111. PCE211-Type dispersants are described more fully in U.S. Ser. No. 11/152,678, filed Jun. 14, 2005, and a continuation-in-part of U.S. Ser. No. 11/152,678, filed June, 2006 by Degussa Construction Polymers, both entitled "Polyether-Containing Copolymer", and herein incorporated by reference.

The molecular weight of the PCE211 Type dispersant is preferably from about 20,000 to about 60,000 Daltons. Surprisingly, it has been found that the higher molecular weight dispersants cause less retardation of set time than dispersants having a molecular weight greater than 60,000 Daltons. Generally longer side chain length, which results in an increase in overall molecular weight, provides better dispersibility. However, tests with gypsum indicate that efficacy of the dispersant is reduced at molecular weights above 50,000 Daltons.

$R^1$ preferably makes up from about 30% to about 99 mole % of the total repeating units, more preferably from about 40 to about 80%. From about 1 to about 70 mole % of the repeating units are $R^2$, more preferably from about 10 to about 60 mole %.

The dispersant is used in any effective amount. To a large extent, the amount of dispersant selected is dependant on the desired fluidity of the slurry. As the amount of water decreases, more dispersant is required to maintain a constant slurry fluidity. Since polycarboxylate dispersants are relatively expensive components, it is preferred to use a small dose, preferably less than 2% or more preferably less than 1% by weight based on the weight of the dry calcium sulfate material. Preferably, the dispersant is used in amounts of about 0.05% to about 0.5% based on the dry weight of the calcium sulfate material. More preferably, the dispersant is used in amounts of about 0.01% to about 0.2% on the same basis. In measuring a liquid dispersant, only the polymer solids are considered in calculating the dosage of the dispersant, and the water from the dispersant is considered when a water/stucco ratio is calculated.

Many polymers can be made with the same repeating units using different distributions of them. The ratio of the acid-containing repeating units to the polyether-containing repeating unit is directly related to the charge density. Preferably, the charge density of the co-polymer is in the range of about 300 to about 3000 μequiv. charges/g co-polymer. It has been found that the most effective dispersant tested for water reduction in this class of dispersants, MELFLUX 2651 F, has the highest charge density.

However, it has also been discovered that the increase in charge density further results in an increase in the retardive effect of the dispersant. Dispersants with a low charge density, such as MELFLUX 2500L, retard the set times less than the MELFLUX 2651F dispersant that has a high charge density. Since retardation in set times increases with the increase in efficacy obtained with dispersants of high charge density, making a slurry with low water, good flowability and reasonable set times requires keeping of the charge density in a mid-range. More preferably, the charge density of the co-polymer is in the range of about 600 to about 2000 μequiv. charges/g co-polymer.

Modifiers are optionally added to a gypsum slurry to enhance performance of a polycarboxylate dispersant. The modifier can be any substance, liquid or solid, which when combined with a polycarboxylate dispersant in a gypsum slurry, leads to an improvement the efficacy of the dispersant. Modifiers are not intended to be dispersants in themselves, but serve to allow the dispersant to be more effective. For example, at constant concentrations of dispersant, better fluidity is obtained when the modifier is used compared to the same slurry without the modifier.

Although the exact chemistry involved in the use of modifiers is not fully understood, at least two different mechanisms are responsible for the increase in dispersant efficacy. Lime, for example, reacts with the polycarboxylate in the aqueous solution to uncoil the dispersant molecule. In contrast, soda ash reacts on the gypsum surface to help improve the dispersant effect. Any mechanism can be used by the modifier to improve the efficacy of the dispersant for the purposes of this invention. Theoretically, if the two mechanisms work independently, combinations of modifiers can be found that utilize the full effect of both mechanisms and result in even better dispersant efficacy.

Preferred modifiers include cement, lime, also known as quicklime or calcium oxide, slaked lime, also known as calcium hydroxide, soda ash, also known as sodium carbonate, potassium carbonate, also known as potash, and other carbonates, silicates, hydroxides, phosphonates and phosphates. Preferred carbonates include sodium and potassium carbonate. Sodium silicate is a preferred silicate.

When lime or slaked lime is used as the modifier, it is used in concentrations of about 0.15% to about 1.0% based on the weight of the dry calcium sulfate material. In the presence of water, lime is quickly converted to calcium hydroxide, or slaked lime, and the pH of the slurry becomes alkaline. The sharp rise in pH can cause a number of changes in the slurry chemistry. Certain additives, including trimetaphosphate, break down as the pH increases. There can also be problems with hydration and, where the slurry is used to make wallboard or gypsum panels, there are problems with paper bond at high pH. For workers who come in contact with the slurry, strongly alkaline compositions can be irritating to the skin and contact should be avoided. Above pH of about 11.5, lime no longer causes an increase in fluidity. Therefore, it is preferred in some applications to hold the pH below about nine for maximum performance from this modifier. In other applications, such as flooring, a high pH has the benefit of minimizing mold and mildew. Alkali metal hydroxides, especially sodium and potassium hydroxides are preferred for use in flooring.

Other preferred modifiers include carbonates, phosphonates, phosphates and silicates. Preferably, the modifiers are used in amounts less than 0.25% based on the weight of the dry calcium sulfate material. Above these concentrations, increases in the amount of modifier causes a decrease in the dispersant efficacy. These modifiers are preferably used in amounts of from about 0.05 to about 0.2 weight %.

Many of the modifiers disclosed above are optionally applied as the landplaster coating. In such cases, the coated landplaster serves two functions, that of reducing premature thickening of the slurry, as well as a delivery vehicle for the modifier. Water demand of the slurry is reduced by permitting use of a dihydrate filler, as well as delivering the modifier that enhances the efficacy of the dispersant. The resulting slurry utilizes water very efficiently.

The charge density of the dispersant has also been found to affect the ability of the modifier to interact with the dispersant. Given a family of dispersants with the same repeating units, the modifier causes a greater increase in efficacy in the dispersant having the higher charge density. It is important to note that although the general trend is to obtain a higher efficacy boost with higher charge density, when comparing the effectiveness of dispersants having different repeating units, the effectiveness of the dispersants may be considerably different at the same charge density. Thus, adjustment of the charge density may not be able to overcome poor fluidity with a particular family of dispersants for that application.

It has also been noted that the reaction of the polycarboxylate dispersants and the modifiers react differently when used in different gypsum media. While not wishing to be bound by theory, the impurities present in gypsum are believed to contribute to the efficacy of both the dispersant and the modifier. Among the impurities present in stucco are salts that vary by geographical location. Many salts are known to be set accelerators or set retarders. These same salts may also change the efficacy of the polycarboxylate dispersant by affecting the degree of fluidity that can be achieved. Some preferred polycarboxylates, including the PCE211-Type Dispersants, are best utilized with a low salt stucco. Other dispersants, such as the 2641-Type Dispersants are suitable for use with high-salt stuccos.

As a result of the use of fluidity enhancing dispersants and modifiers to boost their performance, the amount of water used to fluidize the slurry can be reduced compared to slurries made without these additives. It must be understood that the stucco source, the calcining technique, the dispersant family, the charge density and the modifier all work together to produce a slurry of a given fluidity. In the laboratory, it is possible to reduce the water level close to, equal to, or even below that theoretically required to fully hydrate the calcium sulfate hemihydrate. When used in a commercial setting, process considerations may not allow water reduction to this degree.

When used to make gypsum board, a number of optional additives are useful to improve the properties of the finished article. Traditional amounts of additives are generally used. Amounts of several additives are reported as "lbs/MSF," which stands for pounds of additive per one thousand square feet of board.

Dispersants are used to improve the flowability of the slurry and reduce the amount of water used to make the slurry. Any known dispersant is useful, including polycarboxylates, sulfonated melamines or naphthalene sulfonate. Naphthalene sulfonate is another preferred dispersant, and is used in amounts of about 0 lb/MSF to 18 lb/MSF (78.5 g/m$^2$), preferably from about 4 lb/MSF (17.5 g/m$^2$) to about 12 lb/MSF (52.4 g/m$^2$). A preferred naphthalene sulfonate dispersant is DAXAD Dispersant (Dow Chemical, Midland, Mich.). Even where dispersants are used in the coating, it maybe advantageous to have additional dispersant to further improve the fluidity of the slurry.

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcium sulfate material. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds (2.2 to 11.4 kg) of sugar per 100 pounds (4.5 kg) of calcium sulfate material. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm. Pyrithione is known by several names, including 2-mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$), known as sodium pyrithione (CAS Registry No. 3811-73-2), is one embodiment of this salt that is particularly useful. Pyrithione salts are commercially available from Arch Chemicals, Inc. of Norwalk, Conn., such as Sodium OMADINE or Zinc OMADINE.

In addition, the gypsum composition optionally can include a starch, such as a pregelatinized starch or an acid-modified starch. Starches are used in amounts of from about 3 to about 20 lbs/MSF (14.6 to 97.6 g/m$^2$) to increase paper bond and strengthen product. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 Starch, commercially available from Lauhoff Grain Company and AMERIKOR 818 and HQM PREGEL starches, both commercially available from Archer Daniels Midland Company (Decatur, Ill.). If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or siloxanes are used for water resistance. If stiffness is needed, boric acid is commonly added. Fire retardancy can be improved by the addition of vermiculite. These and other known additives are useful in the present slurry and wallboard formulations. Glass fibers are optionally added to the slurry in amounts of up to 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.439 kg/m$^2$) to improve the water-resistency of the finished gypsum board panel.

Example 1

Gypsum board panels were made using the compositions of Table I. In the test samples, the total amount of calcium sulfate was added as 1640 lbs/MSF of calcium sulfate hemihydrate (stucco) and 255 lbs/MSF of calcium sulfate dihydrate (Landplaster).

TABLE I

| Component | Control, lb/MSF (g/m²) | Sample E, lb/MSF (g/m²) |
| --- | --- | --- |
| Landplaster | 0 | 255 |
| MCM | 4 | 4 |
| HRA | 10.7 | 10.0 |
| Clay | 17 | 17 |
| Retarder | 0.35 | 0.35 |
| Gauging Water | 1120 | 990 |
| Foam Water | 112 | 112 |
| Soap | 0.285 | 0.249 |
| Stucco | 1820 | 1640 |

In a plant trial, stucco was moved by conveyor to the mixer. As the conveyor moved, the dry components including clay, MCM, HRA and set retarder, were added in the amounts of Table I to the stucco using a bag dump. The dry components and gauging water were continuously added to a high-shear pin mixer to form a gypsum slurry. The amount of gauging water was varied to maintain a constant product slump.

A mixture of foam and landplaster was made by adding the landplaster and soap to the foam water and mixing it with a static mixer. The mixture was discharged through a foam ring which forces the foamy mixture under pressure into the gypsum slurry as the slurry passes through the ring.

The foamed slurry travels to the board line in a soft, pliable boot where it is deposited on a paper facing sheet and spread across the width of the sheet. A second paper facing sheet was applied to the top of the slurry, forming a sandwich of continuous gypsum board. The sandwich then passed under a screed bar to press the facing into the soft slurry and to level the forming board to a consistent thickness.

TABLE 2

| Sample | Control | Sample E |
| --- | --- | --- |
| Nail Pull, lbs (N) | 118 | 123 |
| Shrinkage, % | 4.7 | 4.9 |
| Final Set Time, min | 9.1 | 7.5 |
| % Set at Knife | 43 | 59 |

Table 2 shows the results of testing of the control sample with Sample E where 10% of the calcium sulfate hemihydrate was replaced with calcium sulfate dihydrate added after the mixer. Nail pull results show that there is no decrease in strength of the board, and there may be a slight increase in strength. The two boards have essentially the same shrinkage. Although set time and % set at the knife indicate that the addition of the landplaster did accelerate the set point of the slurry, due to the location of the landplaster addition the gypsum did not build up on equipment or in the mixer.

While particular embodiments of the method of using landplaster as a wallboard filler have been shown and described, it will be appreciated by those skilled in the art that changes and modifications may be made thereto without departing from the invention in its broader aspects and as set forth in the following claims.

What is claimed is:

1. A method of making a gypsum slurry comprising:
   combining calcium sulfate hemihydrate, a set retarder and water in a mixer to make a gypsum slurry;
   introducing foam into the gypsum slurry; and
   adding calcium sulfate dihydrate to the gypsum slurry downstream of the mixer.

2. The method of claim 1 wherein said combining step comprises mixing.

3. The method of claim 1 wherein said introducing step comprises making a second slurry of landplaster, water and a foaming agent prior to said adding step and wherein said adding step comprises adding said landplaster in said second slurry downstream of the mixer.

4. The method of claim 1 further comprising measuring an amount of calcium sulfate dihydrate to be from about 3% to about 10% of the total amount of calcium sulfate materials.

5. The method of claim 1, wherein said combining step further comprises adding a polycarboxylate dispersant and a modifier for enhancing performance of said dispersant, wherein said modifier is selected from the group consisting of cement, lime, slaked lime, soda ash, potash, carbonates, silicates, hydroxides, phosphonates and phosphates.

6. The method of claim 1, further comprising adding at least one of the group consisting of a modifier, a fluidity enhancing component, a trimetaphosphate compound, a set accelerator and a thickener to the slurry prior to said dividing step.

7. The method of claim 1 further comprising treating the landplaster with a coating solution prior to said adding step.

8. The method of claim 7 wherein said adding step further comprises adding the coated landplaster in the coating solution to the slurry.

\* \* \* \* \*